US008838548B2

(12) United States Patent
Moyer (10) Patent No.: US 8,838,548 B2
(45) Date of Patent: Sep. 16, 2014

(54) PERFORMING AUTOMATED DATA INTEGRITY VERIFICATION TESTING FOR FILE SYSTEMS

(75) Inventor: Jeffrey E. Moyer, Carlisle, MA (US)

(73) Assignee: Red Hat, Inc., Raleigh, NC (US)

( * ) Notice: Subject to any disclaimer, the term of this patent is extended or adjusted under 35 U.S.C. 154(b) by 506 days.

(21) Appl. No.: 12/956,854

(22) Filed: Nov. 30, 2010

(65) Prior Publication Data

US 2012/0136838 A1 May 31, 2012

(51) Int. Cl.
G06F 17/30 (2006.01)
G06F 7/00 (2006.01)

(52) U.S. Cl.
USPC ........................................................ 707/690

(58) Field of Classification Search
USPC ........................................................ 707/690
See application file for complete search history.

(56) References Cited

U.S. PATENT DOCUMENTS

| 5,636,359 A  * | 6/1997 | Beardsley et al. ............ 711/122 |
| 2004/0078395 A1* | 4/2004 | Rinkevich et al. ........... 707/201 |
| 2010/0027728 A1* | 2/2010 | Sugita et al. ................... 375/354 |

* cited by examiner

Primary Examiner — Kuen Lu
(74) Attorney, Agent, or Firm — Lowenstein Sandler LLP (57) ABSTRACT

A mechanism for performing automated data integrity verification testing for file systems is described. A method of embodiments of the invention includes initiating a temporary termination of connection between a computer system and a storage medium that is coupled to a file system. The method further includes restoring the connection between the computer system and the storage medium, transmitting data records including transactions indicating data blocks reported to have been committed to the storage device, and facilitating data verification testing at the computer system, the data verification testing including reconciling the data records with contents of files of the file system. The data records represent data blocks that are notified as being committed to the storage medium, and the contents of the files represent data blocks actually committed to the storage device.

20 Claims, 5 Drawing Sheets

PERFORMING AUTOMATED DATA INTEGRITY VERIFICATION TESTING FOR FILE SYSTEMS

TECHNICAL FIELD

The embodiments of the invention relate generally to data storage and, more specifically, relate to a mechanism for performing automated data integrity verification testing for file systems.

BACKGROUND

In a typical computing environment, it is reasonable for a user to expect the data to be stored on a storage device when a notification indicating the data has been stored is provided to the user. For example, if a software application running on a computer system issues input/output (I/O) operations (also referred to as "data blocks" or simply "I/Os") and the user receives a notification indicating that the I/O operations (or the relevant transactions or processes) have been committed to a storage device, it would be reasonable on the user's part to expect that commitment. However, occasionally, the data said to have been stored on the storage device is not stored or only partially stored due to bugs in the software or due to hardware failure and consequently, the user is mislead. Several tests, such as testing power outages or disconnections from storage, have been employed to exercise corner cases to help expose, for example, software bugs in I/O paths (including system call interface, the file system, the block layer, and down to the device drivers or even drive firmware) and to guarantee that when the user is notified of data commitment, the data is in fact committed to the storage device where it can be preserved and accessed (such as after the power is resumed). However, these testing techniques are limited in approach, cumbersome, and inefficient, primarily due to their manual nature and thus, the potential for human error. These conventional testing techniques include pulling computer system and/or storage device power cables from power outlets, manually turning off power switches, or pulling cables from, for example, Small Computer System Interface (SCSI) devices.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Embodiments of the invention provide a mechanism for performing automated data integrity verification testing for file systems. A method of embodiments of the invention includes initiating a temporary termination of connection between a computer system and a storage medium that is coupled to a file system. The method further includes restoring the connection between the computer system and the storage medium, transmitting data records including transactions indicating data blocks reported to have been committed to the storage device, and facilitating data verification testing at the computer system, the data verification testing including reconciling the data records with contents of files of the file system. The data records represent data blocks that are notified as being committed to the storage medium, and the contents of the files represent data blocks actually committed to the storage device.

In one embodiment, an automated data verification mechanism is provided to test commitment of data blocks to local and/or remote storage devices and to return results that are inconsistent with commitment notifications provided to the user, such as when the commitment notifications do not match reality. The automated data verification mechanism eliminates the need for performing manual tests (e.g., pulling power cords from outlets) that are prone to human error and inefficiency. Further, the verification mechanism, in one embodiment, supports data testing on not only local storage devices, but also on those that are remotely connected (e.g., Internet Small Computer System Interface ("iSCSI"), storage area network ("SAN"), etc.) to the computer system.

Figure 1:
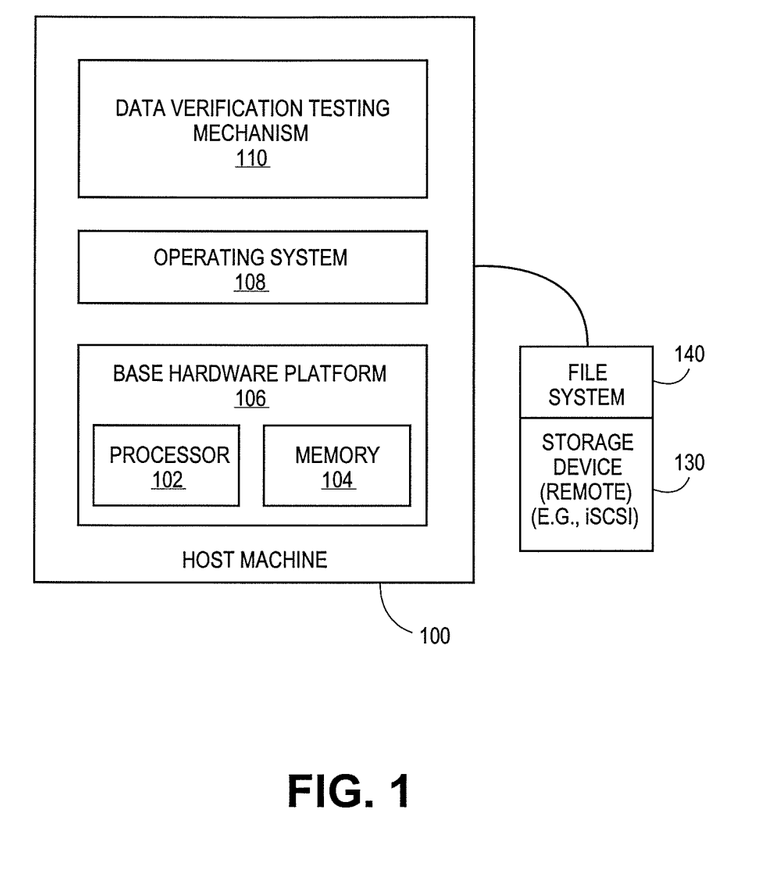
FIG. 1 illustrates a host machine employing data verification testing mechanism according to one embodiment of the invention.

FIG. 1 illustrates a host machine 100 employing data verification testing mechanism 110 according to one embodiment of the invention. Host machine 100 includes a base hardware platform 106 that comprises a computing platform, which may be capable, for example, of working with a standard operating system 108. Operating system 108 serves as an interface between any hardware or physical resources of the host machine 100 and a user. In some embodiments, base hardware platform 106 may include a processor 102, memory devices 104, network devices, drivers, and so on. Host machine 100 may include a server computing system or a client computing system. Further, terms like "machine", "device", "computer", and "computing system" are used interchangeably and synonymously throughout this document.

In one embodiment, host machine 100 employs the data verification testing mechanism 110 ("testing mechanism") to perform automated testing of data persistence on a storage device 130 connected with a file system 140. A storage device may be local and employed on the host machine 100 or, as illustrated, a storage device 130 (e.g., a network storage device, such as an iSCSI storage device) may be remote and in communication with the host machine 100. The storage device 130 is illustrated as being remote which is periodically power cycled using the testing mechanism 100 employed at the host machine 100. This will be further described with reference to FIG. 2.

In one embodiment, the verification mechanism 110 performs periodic data verification or testing ("data testing") so that a user (e.g., system administrator, software programmer, end-user, etc.) receives a reliable notification of the data being committed to the storage device 130, and errors leading to unreliable notifications can be reported. Data testing includes periodic intentional power outage (e.g., pulling of a cable) and performing subsequent verifications upon returning the power (e.g., reinsertion of the power cable). Stated differently, a commitment notification is regarded reliable and communicated to the user (e.g., via an email, text message, log entry on a log, a pop-up window, etc.) only if the data referenced in the notification is actually stored at the storage device 130 and will be there for the user to access. The frequency at which this periodic data testing is performed may depend on predetermined criteria (e.g., occurrence of an event or completion of a time period) as set forth, for example, by the user. For example, the user may preset a condition that data testing is triggered each time a particular number of data blocks have been committed to a storage device. The user may also be allowed to define the size of a data block or of its corresponding file in a file system used by the host machine 100 to communicate with the storage device 130.

Figure 2:
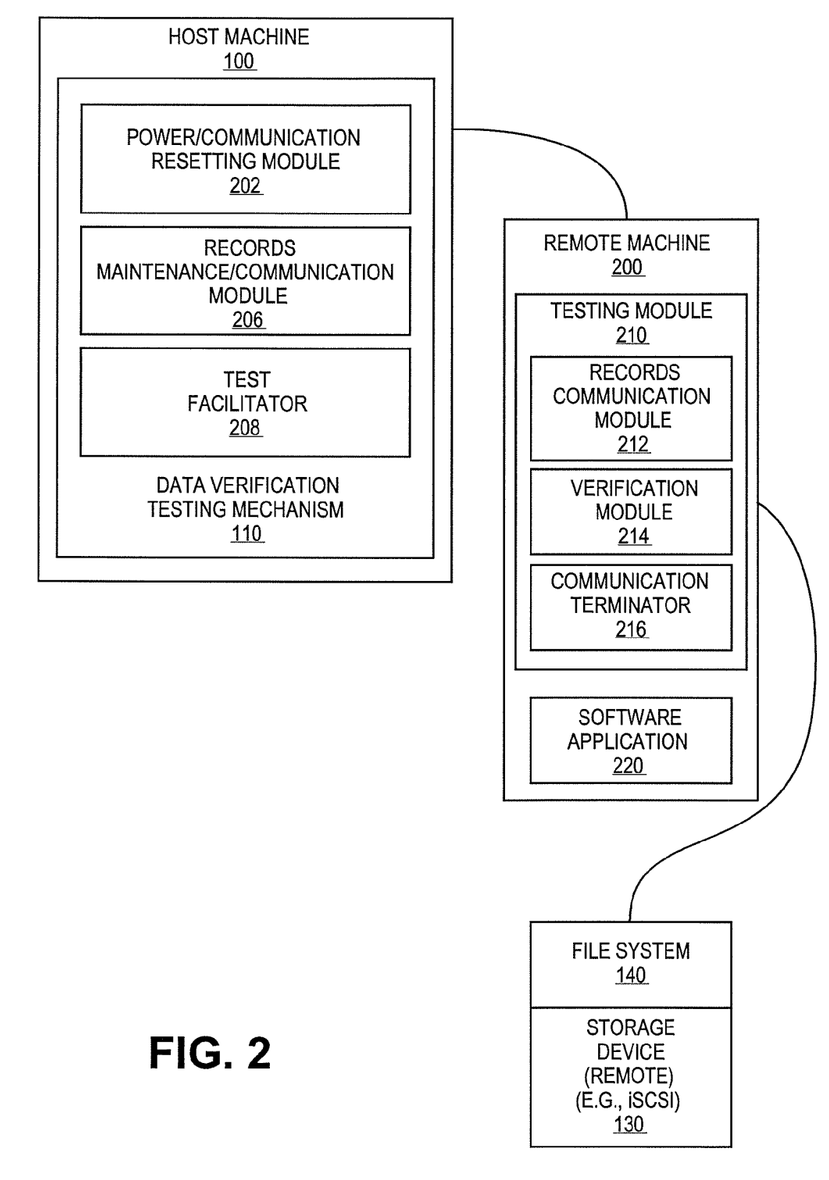
FIG. 2 illustrates data verification testing mechanism facilitating data testing according to one embodiment of the invention.

FIG. 2 illustrates data verification testing mechanism 110 facilitating data testing according to one embodiment of the invention. In the illustrated embodiment, verification mechanism 110 is employed on host machine 110 to facilitate data testing at a remote machine 200, such as testing the process of data being committed to a storage device 130 that is in communication with the remote machine 200 through a file system 140. In one embodiment, the verification mechanism 110 facilitates this data testing on the remote machine 210 using a test module 210. In one embodiment, the test module 210 is shown as being employed on the remote machine to perform data testing on files contained in the file system 140. Each of these files represents and is mapped to a data block or I/O (e.g., a write I/O or a write data block) issued by software application 220 and stored at the storage device 130. In other words, each file of file system 140 is a proxy of a data block stored at the storage device 130, while the file system 140 serves as an organizing entity for the files (and thus, for the committed data blocks) as well as an intermediate entity between the storage device 130 and the remote machine 200.

In another embodiment, the test module 210 is a component of the verification mechanism 110 and may be employed, as part of the verification mechanism 110, on a single machine (such as the host machine 100 or the remote machine 200), i.e., the same machine on which data testing is being performed. For example, if data testing is to be performed on and by the host machine 100, the verification mechanism 110 that includes the test module 210 may be employed on the host machine 100. In the illustrated embodiment, the verification mechanism 110 includes a power/communication resetting module ("resetting module") 202, a record maintenance/communication module ("records module") 206, and a test facilitator 208, while the test module 210 includes a records communication module 212, a verification module 214, and a communication terminator 216.

Software application 220 runs on the remote machine 200 and issues data blocks to be committed to the storage device 130 and further stored as files in the file system 140. As each data block is issued by the software application 220, a data record relating to that data block (e.g., whether the data block is committed to the storage device 130 and the file system 130 or remains uncommitted) is prepared by remote machine 200. After each data block is committed, its corresponding data record is then transmitted, via the records communication module 212 of the test module 210, to the maintenance module 206 at the verification mechanism 110. The maintenance module 206 preserves this data record and other such data records. If, for example, a data record indicates commitment of a data block, then that data block is expected to be committed and vice versa.

In one embodiment, based on predetermined criteria as defined by the user, the resetting module 202 triggers resetting of the remote machine 200. For example, the predetermined criteria may include an instruction to trigger a reset at the remote machine 200 upon occurrence of an event (e.g., reaching a number of data blocks that are designated as committed or data records received by the maintenance module) or reaching a time threshold (e.g., expiration of a pre-defined time period, etc.). In one embodiment, upon meeting the predetermined criteria, resetting module 202 acts to automatically and remotely turn off the power to the remote machine 200 and/or the storage device 130. For example, as soon and as often as a predetermined event occurs, a power reset of the remote machine 200 is performed. This power reset may include a complete power turn off or a power reset.

Regarding the storage device 130, if it is employed on or is part of the remote machine 200, the storage device's power is automatically reset along with that of the remote machine 200 and thus, no more data blocks are written or committed to the storage device once the power is turned off. However, in case of a remote or standalone storage device (e.g., iSCSI, SAN device, other network storage devices, etc.) that is in communication with the remote machine 200, as illustrated here, the communication terminator 216 of the test module 210 may be triggered by the resetting module 202 to end the remote machine's connection with the storage device 130 and the file system 140 either by, automatically and remotely, turning off the power to storage device 130 or simply disconnecting with it, such as using fibre channel switching zoning features to isolate the host machine 110 from the storage device 130.

In one embodiment, based on whether the power reset included a power off or a power reboot and/or a predetermined criteria (e.g., upon passing of time period), the resetting module 202, automatically and remotely, restores the power to the remote machine 200 and/or the storage device 130. With the power restored, communication between the two machines 100, 200, the storage device 130, and the file system 130 is also restored. Once the power is restored, the maintenance module 206 transmits back the previously received data records to the records module 212 of the test module 210. This, in one embodiment, is followed by the test facilitator 208 facilitating the verification module 214 to perform data testing by verifying the information contained in the received data records with the information contained in the files at the file system 140. Given that the files at the file system 140 are proxies of the data blocks that are committed to the storage device 130, while the data records represent verification of that commitment, the content of the data records are expected to reconcile with that of the files. If they reconcile, the storage system is regarded as working well. If, however, the two contents do not reconcile, an error is detected and then reported to the user for troubleshooting and correction.

As aforementioned, power resetting and data testing may be performed randomly, in response to requests (e.g., requests from the remote machine 200 or users, etc.), or at a particular frequency based on a predetermined criteria as set forth by the user (e.g., upon occurrence of an event (e.g., a number of data blocks committed to the storage device 130) or reaching a predefined time period, etc.) or as desired or deemed necessary based on relevant factors, such as historical performances of the software application 220, remote machine bandwidth, storage device and file system capacity, etc. In one embodiment, data testing, as aforementioned, is performed on and using files at the file system 140 without having the need to directly access data blocks at the storage device 130. However, in another embodiment, data testing may be directly performed on data blocks at the storage device 130.

Figure 3A:
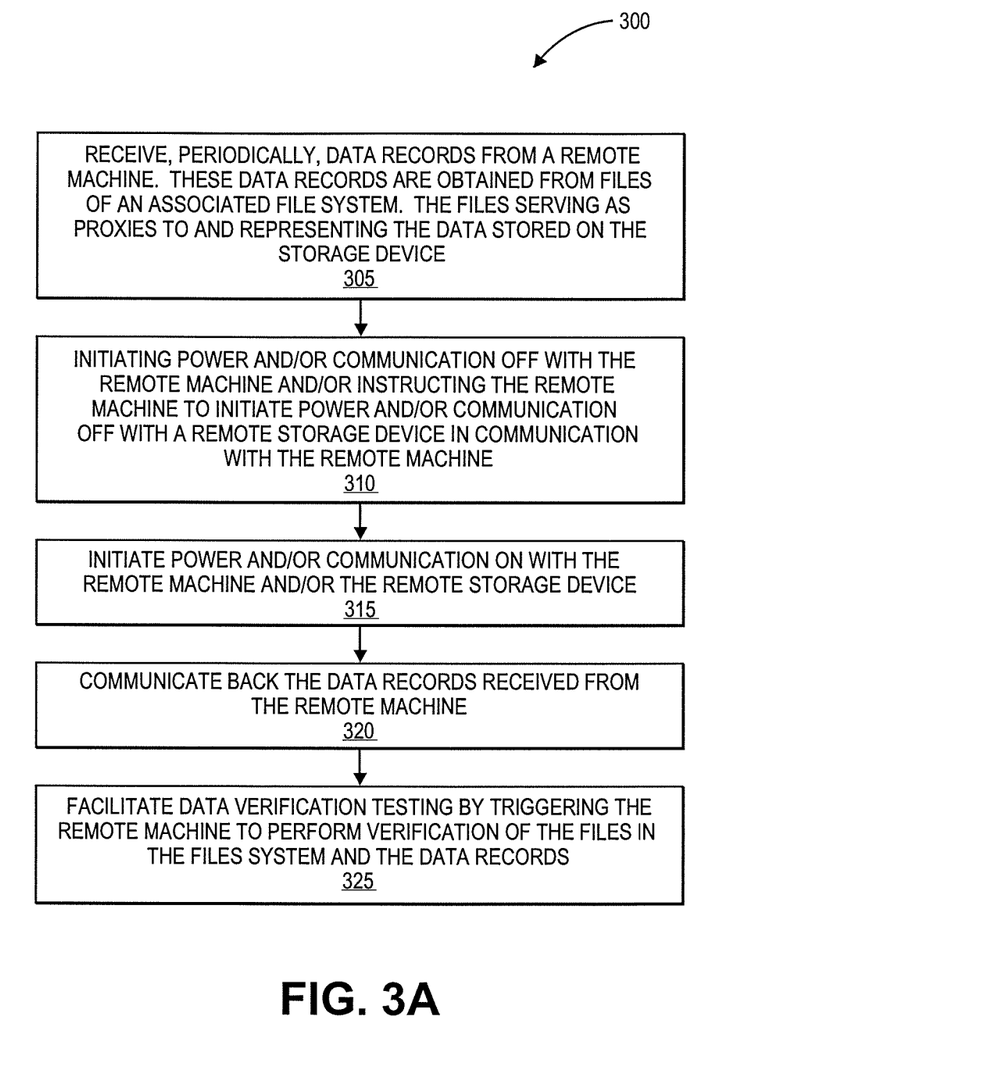
FIG. 3A illustrates a method for facilitating data testing using verification mechanism according to one embodiment of the invention.

FIG. 3A illustrates a method for facilitating data testing using verification mechanism according to one embodiment of the invention. Method 300 may be performed by processing logic that may comprise hardware (e.g., circuitry, dedicated logic, programmable logic, microcode, etc.), software (such as instructions run on a processing device), or a combination thereof, such as firmware or functional circuitry within hardware devices. In one embodiment, method 300 is performed by verification mechanism of FIGS. 1 and 2.

Method 300 begins with periodically receiving, at a first computer system, data records from a second computer system at block 305. These data records are prepared and transmitted to the first computer system each time a data block (e.g., I/O operation, such as a write I/O) is committed to a storage device. Each data block is represented by a corresponding file stored at a file system. At block 310, in one embodiment, verification mechanism at the first computer system triggers an automatic and remote power off of the second computer system including the storage device. In case of a remote storage device connected with the second computer system, either the storage device's power is automatically and remotely turned off or the communication between the storage device and the second computer system is terminated.

At block 315, the power (and/or communication) is restored and the second computer system and the storage device are up and running again. At block 320, the data records received at the first computer system are communicated back to the second computer system. At block 325, in one embodiment, the verification mechanism of the first computer system facilitates data testing on the second computer system by having the second computer system verify and match the content of data records with the content of files of the file system. If the two contents are reconciled, the storage system is regarded as working well; otherwise, an error report is prepared and communicated to the user to, for example, troubleshoot and correct the error.

Figure 3B:
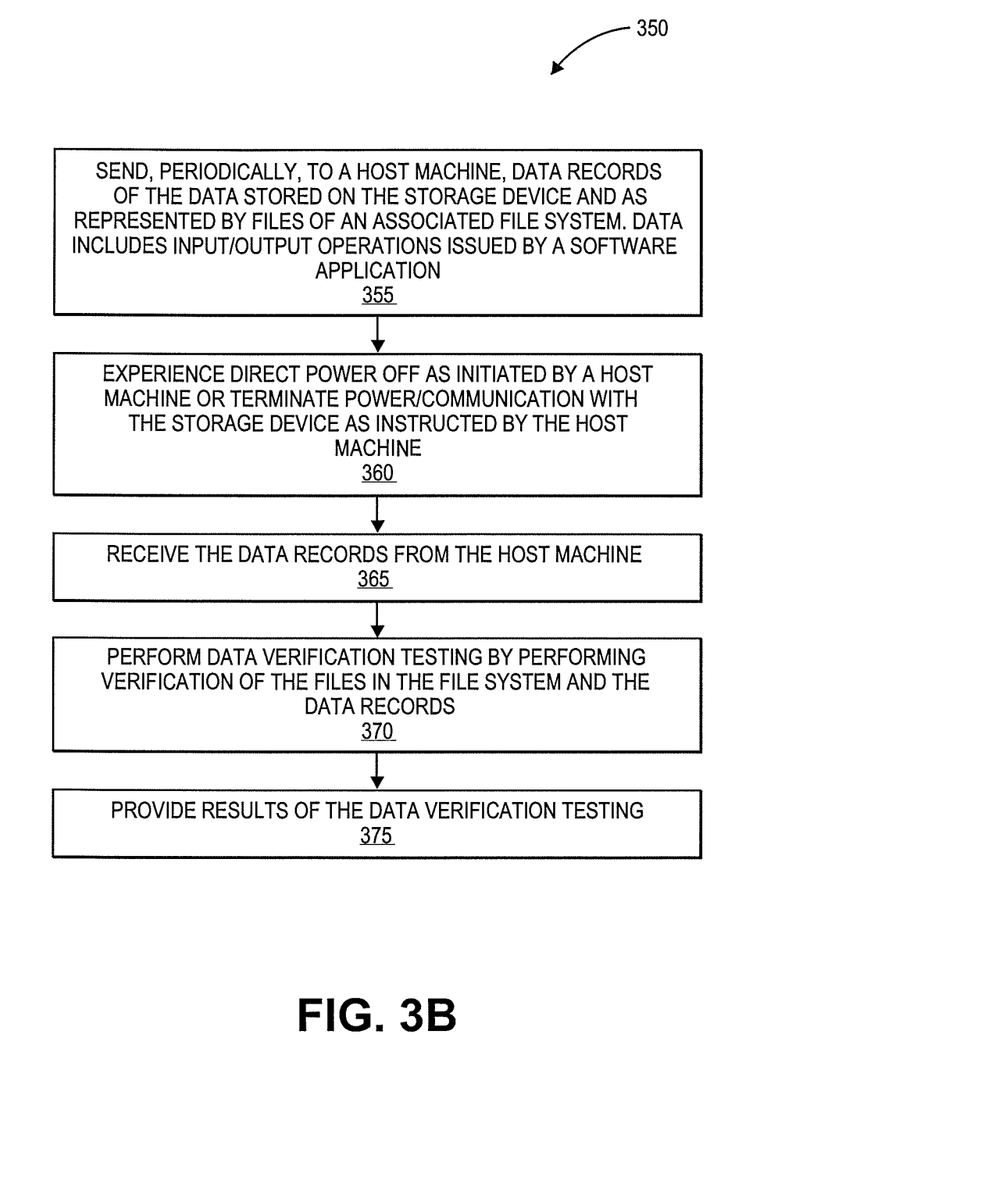
FIG. 3B illustrates a method for performing data testing using a testing module as facilitated by verification mechanism according to one embodiment of the invention.

FIG. 3B illustrates a method for performing data testing using a testing module as facilitated by verification mechanism according to one embodiment of the invention. Method 350 may be performed by processing logic that may comprise hardware (e.g., circuitry, dedicated logic, programmable logic, microcode, etc.), software (such as instructions run on a processing device), or a combination thereof, such as firmware or functional circuitry within hardware devices. In one embodiment, method 350 is performed by verification mechanism and test module of FIGS. 1 and 2.

Method 350 begins a second computer system periodically sending data records to a first computer system at block 355. At block 360, the second computer system experiences an automatic power off initiated by the first computer system. If the storage device is part of the second computer system, the storage device's power is automatically turned off as the second computer system's power is turned off. If, however, the storage device is a standalone and remotely located, the second computer system is triggered to automatically and remotely turn off the storage device's power or simply disconnect with the storage device.

At block 365, the power (and/or communication) is restored and the second computer system and the storage device are up and running again. At block 370, in one embodiment, the test module at second computer system is facilitated by the verification mechanism of the first computer system to perform data testing. The data testing includes verifying contents of the data records by matching them against contents of the files at the file system representing data blocks stored at the storage device. At block 375, based on whether the two contents got reconciled or not, data testing results are provided to the user.

Figure 4:
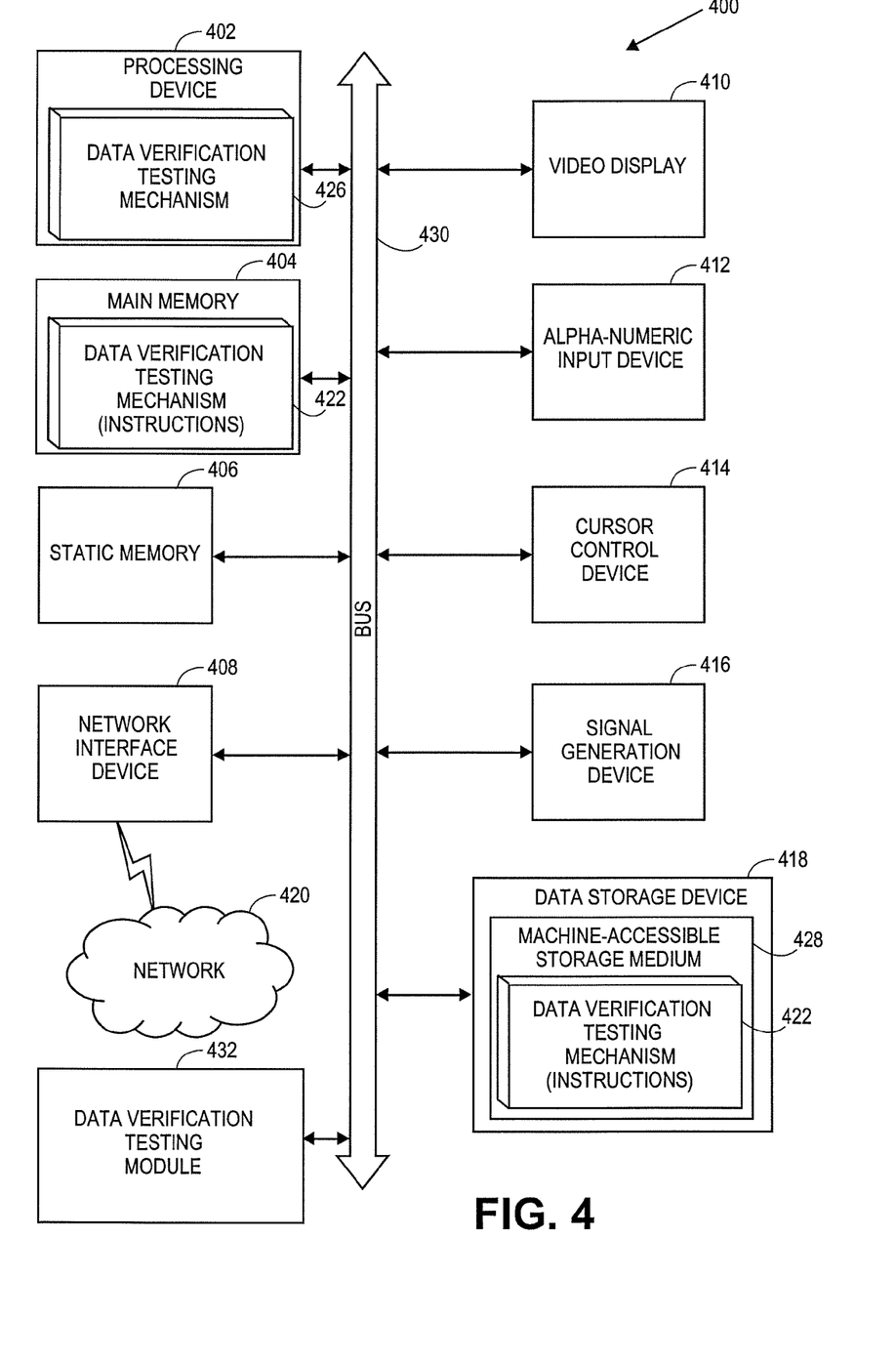
FIG. 4 illustrates a computing system according to one embodiment of the invention.

FIG. 4 illustrates a computing system 400 employing a data verification testing mechanism including testing module according to one embodiment of the invention. Within the computing system 400 is a set of instructions for causing the machine to perform any one or more of the methodologies discussed herein. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computing system 400 includes a processing device 402, a main memory 404 (e.g., read-only memory (ROM), flash memory, RAM, dynamic RAM (DRAM) such as synchronous DRAM (SDRAM), DRAM (RDRAM), etc.), a static memory 406 (e.g., flash memory, static random access memory (SRAM), etc.), and a secondary memory 418 (e.g., a data storage device in the form of a drive unit, which may include fixed or removable machine-accessible or computer-readable storage medium), which communicate with each other via a bus 430.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. Processing device 402 is configured to execute the processing logic 426 for performing the operations and methods discussed herein.

The computing system 400 may further include a network interface device 408. The computing system 400 also may include a video display unit 410 (e.g., a liquid crystal display (LCD) or a cathode ray tube (CRT)) connected to the computing system through a graphics port and graphics chipset, an alphanumeric input device 412 (e.g., a keyboard), a cursor control device 414 (e.g., a mouse), and a signal generation device 416 (e.g., a speaker).

The data storage device 418 may include a machine-accessible storage medium (or a computer-readable storage medium) 428 on which is stored one or more sets of instructions 422 (e.g., data verification testing mechanism including testing module) embodying any one or more of the methodologies or functions described herein. The data verification testing mechanism including testing module may also reside, completely or at least partially, within the main memory 404 (e.g., data verification testing mechanism including testing module (instructions) 422) and/or within the processing device 402 (e.g., data verification testing mechanism including testing module (processing logic) 426) during execution thereof by the computing system 400, the main memory 404 and the processing device 402 also constituting machine-readable storage media. Further, for example, the data verification testing mechanism including testing module instructions 422 may be transmitted or received over a network 420 via the network interface device 408.

The machine-readable storage medium 428 may also be used to store the data verification testing mechanism including testing module (instructions) 422 persistently. While the machine-accessible storage medium 428 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Data verification testing mechanism modules 432, components and other features described herein (for example in relation to FIGS. 1 and 2) can be implemented as discrete hardware components or integrated in the functionality of hardware components such as ASICS, FPGAs, DSPs or similar devices. In addition, the modules 432 can be implemented as firmware or functional circuitry within hardware devices. Further, the modules 432 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "initiating", "restoring", "comparing", "transmitting", "facilitating", "saving", "storing", "receiving", "verifying", "reconciling", "communicating", "accessing", "providing", "terminating", "sending", "experiencing", "performing" or the like, refer to the action and processes of a computing system, or similar electronic computing device, that manipulates and transforms data represented as physical (electronic) quantities within the computing system's registers and memories into other data similarly represented as physical quantities within the computing system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, magnetic-optical disks, ROMs, compact disk ROMs (CD-ROMs), RAMs, erasable programmable ROMs (EPROMs), electrically EPROMs (EEPROMs), magnetic or optical cards, or any type of media suitable for storing electronic instructions, each coupled to a computing system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computing system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., ROM, RAM, magnetic disk storage media, optical storage media, flash memory devices, etc.), a machine (e.g., computer) readable transmission medium (non-propagating electrical, optical, or acoustical signals), etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A method comprising:

receiving, by a host computer system, data records from a remote computer system communicably coupled to the host computer system, wherein each of the data records corresponds to a data block of a file system of the host computer system and indicates whether the data block is either committed or not committed to a storage medium communicably coupled to the file system of the remote computer system;

resetting, by the host computer system, a connection between the remote computer system and the storage medium, wherein the resetting comprises powering down and then restarting both of the remote computer system and the storage medium; and subsequent to the resetting, transmitting, by the host computer system to the remote computer system, the data records previously received by the host computer system from the remote computer system;

wherein the remote computer system verifies that the data records transmitted to the remote computer system from the host computer system reconcile with contents of files of the file system.

2. The method of claim 1, wherein the remote computer system transmits the data records to the host computer system upon an operation to commit the data block to the file system.

3. The method of claim 1, wherein the storage medium comprises a storage device comprising an Internet Small Computer System Interface (iSCSI)-based data storage device or a storage area network (SAN)-based storage device.

4. The method of claim 1, wherein the resetting comprises at least one of turning off power supply to the storage device or terminating communication between the remote computer system and the storage device.

5. The method of claim 4, wherein the resetting further comprises turning off power supply to the remote computer system.

6. The method of claim 1, wherein the file system comprises a database organizing the files in a manner that is retrievable by an operating system of the remote computer system.

7. The method of claim 6, wherein the data blocks comprise input/output (I/O) operations issued by a software application running on the remote computer system.

8. A host computer system comprising:
a memory to store instructions for data integrity verification testing;
a processing device communicably coupled to the memory, the processing device to execute the instructions, wherein the instructions cause the processing device to:
receive data records from a remote computer system communicably coupled to the host computer system, wherein each of the data records corresponds to a data block of a file system of the host computer system and indicates whether the data block is either committed or not committed to a storage medium communicably coupled to the file system of the remote computer system;
reset a connection between the remote computer system and the storage medium, wherein the resetting comprises powering down and then restarting both of the remote computer system and the storage medium; and
subsequent to the resetting, transmit, to the remote computer system, the data records previously received by the host computer system from the remote computer system;
wherein the remote computer system verifies that the data records transmitted to the remote computer system from the host computer system reconcile with contents of files of the file system.

9. The system of claim 8, wherein the processing device is further to wherein the remote computer system to transmit the data records to the host computer system upon an operation to commit the data block to the file system.

10. The system of claim 8, wherein the storage medium comprises a storage device comprising an Internet Small Computer System Interface (iSCSI)-based data storage device or a storage area network (SAN)-based storage device.

11. The system of claim 8, wherein the resetting comprises at least one of turning off power supply to the storage device or terminating communication between the remote computer system and the storage device.

12. The system of claim 11, wherein the resetting further comprises turning off power supply to the remote computer system.

13. The system of claim 12, wherein the data blocks comprise input/output (I/O) operations issued by a software application running on the remote computer system.

14. The system of claim 11, wherein the file system comprises a database organizing the files in a manner that is retrievable by an operating system of the remote computer system.

15. A non-transitory machine-readable medium including instructions that, when executed by a processing device, cause the processing device to perform operations comprising:
receiving, by a host computer system comprising the processing device, data records from a remote computer system communicably coupled to the host computer system, wherein each of the data records corresponds to a data block of a file system of the host computer system and indicates whether the data block is either committed or not committed to a storage medium communicably coupled to the file system of the remote computer system;
resetting, by the host computer system, a connection between the remote computer system and the storage medium, wherein the resetting comprises powering down and then restarting both of the remote computer system and the storage medium; and
subsequent to the resetting, transmitting, by the host computer system to the remote computer system, the data records previously received by the host computer system from the remote computer system;
wherein the remote computer system verifies that the data records transmitted to the remote computer system from the host computer system reconcile with contents of files of the file system.

16. The non-transitory machine-readable medium of claim 15, wherein the operations further comprise wherein the remote computer system transmits the data records to the host computer system upon an operation to commit the data block to the file system.

17. The non-transitory machine-readable medium of claim 15, wherein the storage medium comprises a storage device comprising an Internet Small Computer System Interface (iSCSI)-based data storage device or a storage area network (SAN)-based storage device.

18. The non-transitory machine-readable medium of claim 15, wherein the resetting comprises at least one of turning off power supply to the storage device or terminating communication between the remote computer system and the storage device.

19. The non-transitory machine-readable medium of claim 18, wherein the resetting further comprises turning off power supply to the remote computer system.

20. The non-transitory machine-readable medium of claim 18, wherein the file system comprises a database organizing the files in a manner that is retrievable by an operating system of the remote computer system.

* * * * *